(12) United States Patent
Zhang et al.

(10) Patent No.: US 10,763,059 B2
(45) Date of Patent: Sep. 1, 2020

(54) SWITCH PANEL ASSEMBLY, SWITCH ASSEMBLY AND ASSOCIATED MANUFACTURING METHOD

(71) Applicant: Schneider Electric (Australia) Pty. Ltd.

(72) Inventors: Dahai Zhang, Shenzhen (CN); Zhen Ma, Shenzhen (CN); Pei Shang, Shenzhen (CN)

(73) Assignee: Schneider Electric (Australia) Pty Ltd, Macquarie Park (AU)

( * ) Notice: Subject to any disclaimer, the term of this patent is extended or adjusted under 35 U.S.C. 154(b) by 0 days.

(21) Appl. No.: 16/050,524

(22) Filed: Jul. 31, 2018

(65) Prior Publication Data

US 2020/0043683 A1 Feb. 6, 2020

(51) Int. Cl.
*H01H 23/04* (2006.01)
*H01H 23/08* (2006.01)

(52) U.S. Cl.
CPC ............ *H01H 23/04* (2013.01); *H01H 23/08* (2013.01)

(58) Field of Classification Search
CPC ........ H01H 23/04; H01H 23/08; H01H 23/24; H01H 23/06; H01H 23/12; H01H 23/14; H01H 23/143

USPC .... 200/333, 6 R, 293, 294, 296, 302.3, 315, 200/339, 553–563; 174/53–56, 66, 67

See application file for complete search history.

(56) References Cited

U.S. PATENT DOCUMENTS 8,525,372 B2 * 9/2013 Huang ................. H01H 9/0271
200/329
8,592,703 B2 * 11/2013 Johnson ................. H01H 23/02
200/339

* cited by examiner

*Primary Examiner* — Edwin A. Leon
*Assistant Examiner* — Lheiren Mae A Caroc
(74) *Attorney, Agent, or Firm* — Locke Lord LLP

(57) ABSTRACT

Embodiments of present disclosure provide a switch panel assembly comprising: a cover including a body and an first opening formed on the body; and a first button received in the first opening and switchable between a first position and a second position; the first button being coplanar with the cover while in the first position and being non-coplanar with the cover while in the second position. The first button of the switch panel assembly according to embodiments of the present disclosure is coplanar with the cover in one of the on or off status, which leads to a better appearance of the switch assembly.

12 Claims, 14 Drawing Sheets

SWITCH PANEL ASSEMBLY, SWITCH ASSEMBLY AND ASSOCIATED MANUFACTURING METHOD

FIELD

Embodiments of present disclosure generally relate to electrical device, and more specifically, to a switch panel assembly and a switch assembly having the same.

BACKGROUND

Switch assemblies embedded in the walls of buildings (such as offices, houses, etc.) are widely used. A switch assembly typically comprises a switch module and a cover. The switch module generally comprises a button for a user to press. In addition, both the switch module and the cover are provided with threaded holes. These two parts are connected by screws through the threaded holes. These elements may have negative impact on the elegance of appearance of the switch.

SUMMARY

Embodiments of the present disclosure provide a switch panel assembly, a switch assembly having the same, a method for manufacturing the switch panel assembly and a method for manufacturing the switch assembly.

In first aspect, a switch panel assembly is provided. The switch panel assembly comprises: a cover including a body and an first opening formed on the body; and a first button received in the first opening and switchable between a first position and a second position; the first button being coplanar with the cover while in the first position and being non-coplanar with the cover while in the second position.

Different from convention switch where the button is always tilted relative to the cover no matter the switch module is turned on or turned off, according to embodiments of the present disclosure, the first button of the switch panel assembly can coplanar with the cover when the switch is turned on or off. This will significantly improve the appearance of the switch assembly.

In some embodiments, the cover comprises at least one arm across the first opening, each of the at least one arm comprising a first section and a second section, wherein the first and second sections are tilt with each other.

In some embodiments, the first button is in contact with the first section while in the first position, and is in contact with the second section while in the second position.

In some embodiments, the cover further comprises at least one connecting component adapted to connect the cover to a switch module.

In some embodiments, the at least one connecting component comprises a first set of connecting elements arranged on at least one inner side of a flange around the body of the cover. The first set of connecting elements adapted to engage a second set of connecting elements of the switch module.

In some embodiments, the at least one connecting component comprises a sliding lock mechanism. The sliding lock mechanism comprises a body coupled to at least one elastic element arranged on the inner surface of the cover. The at least one elastic element is adapted to be hold the body in a lock position where a third set of connecting elements of the switch module is locked with the body. The sliding lock mechanism further comprises a tongue portion adapted to insert into an opening formed on the flange when the body is in the lock position. The tongue portion is adapted to, in response to a force applied from outside of the flange, move to a release position where the third set of connecting elements are released from the body.

In some embodiments, the switch panel assembly further comprises a set of guiding elements arranged on the inner surface of the cover. The body is adapted to move along the set of guiding elements between the lock and release positions.

In some embodiments, the at least one connecting component further comprises a fourth set of connecting elements formed on the body, and adapted to engage the third set of connecting elements of the switch module when the body being in the lock position.

In some embodiments, the at least one elastic element comprises at least one of the following: an elastic wire, a spring, and an elastic wall.

In some embodiments, the at least one connecting component comprises a fifth set of connecting elements arranged on at least one inner side of a flange around the body and adapted to connect the cover to an intermediate cover fixed on the switch module.

In some embodiments, the at least one connecting component comprises at least one supporting arm extending away from the body of the cover and at least one connecting arm supported by the at least one supporting arm. The at least one connecting component comprises a sixth set of connecting elements arranged on the at least one connecting arm to connect the cover to the intermediate cover.

In some embodiments, the first button comprises at least one protrusion extending inwardly.

In some embodiments, the at least one protrusion comprises a first protrusion and a second protrusion, the first protrusion being higher than the second protrusion.

In some embodiments, the first and second protrusions are located adjacent to two ends of the first opening respectively.

In some embodiments, the first button further comprises a first flange extending inwardly and arranged on the edge of the first button adjacent to the first protrusion.

In some embodiments, the first button further comprises at least one second flange extending inwardly and arranged on at least one of the edges of the first button traversely to the first flange.

In some embodiments, the first button further comprises a first connecting plate having a first hole thereon and adapted to engage a first shaft on the cover.

In some embodiments, the first button further comprises a second connecting plate having a second hole thereon and adapted to engage a second shaft on the cover.

In second aspect, a switch assembly is provided. The switch assembly comprises a switch panel assembly according to any of preceding claims, and a switch module having a second button, wherein the switch module is covered by the switch panel assembly.

In third aspect, a method for manufacturing the switch panel assembly according to the first aspect is provided In fourth aspect, a method for manufacturing the switch assembly according to the second aspect is provided.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Figure 1A:
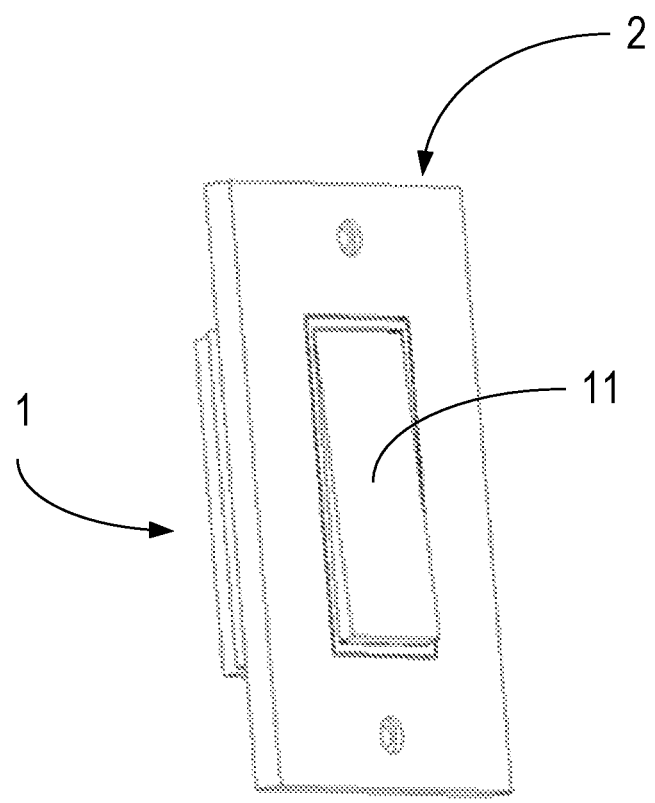
FIG. 1A illustrates a perspective view of a conventional switch assembly.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

Currently, user's requirements for a beautiful and simple appearance are increasing rapidly. The tilted location of the button relative to the cover affects the appearance of the switch assemblies. Furthermore, replaceable covers have a wide market prospect due to the strong desire of individual requirements (such as color, material, pattern etc.). However, since the cover is fixed to the switch module by screws, a user has to use special additional tools, such as a screwdriver, to assemble and remove the cover. Therefore, it is inconvenient for a user to change the cover.

Figure 1B:
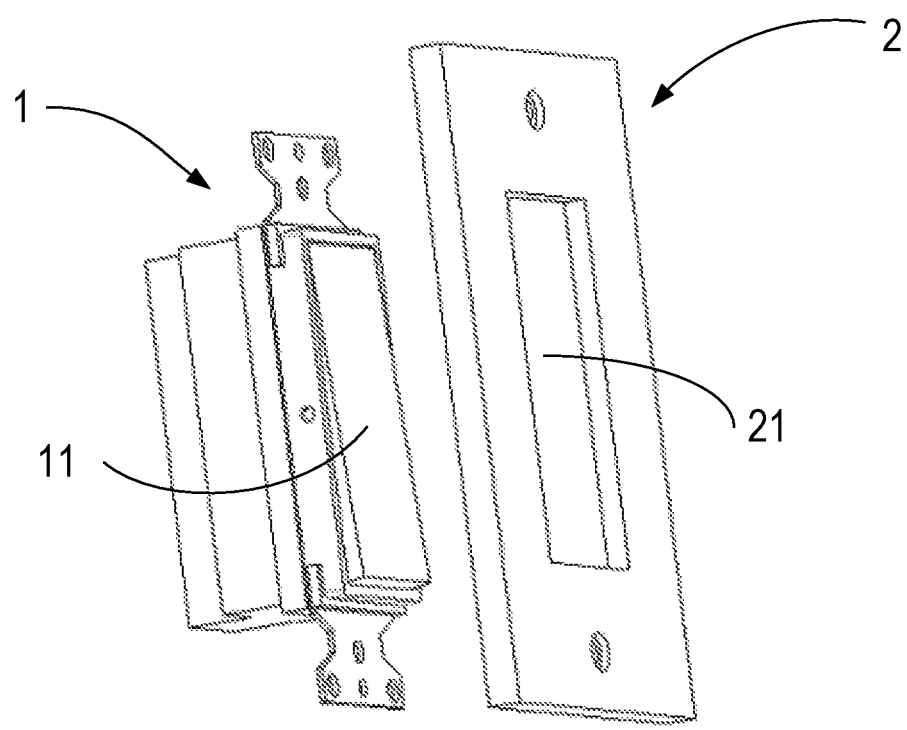
FIG. 1B illustrates an explosive perspective view of a conventional switch assembly.

FIG. 1A illustrates a perspective view of a conventional switch assembly, and FIG. 1B illustrates an explosive perspective view of a conventional switch assembly. As shown, the switch assembly comprises a switch module 1 and a cover 2. A user can control the switch module 1 by pressing a button 11 of the switch module 1 through an opening 21 on the cover 2. In this arrangement, the button 11 is always tilted relative to the cover 2, whether the switch module 1 is turned on or turned off.

Furthermore, both the switch module 1 and the cover 2 are provided with screw holes, so that they can be connected by screws in the screw holes. Since the cover 2 is fixed to the switch module 1 by screws, a user has to use special additional tools, such as a screwdriver, to assemble or remove the cover 2. Therefore, it is inconvenient for a user to change the cover 2.

Figure 2A:
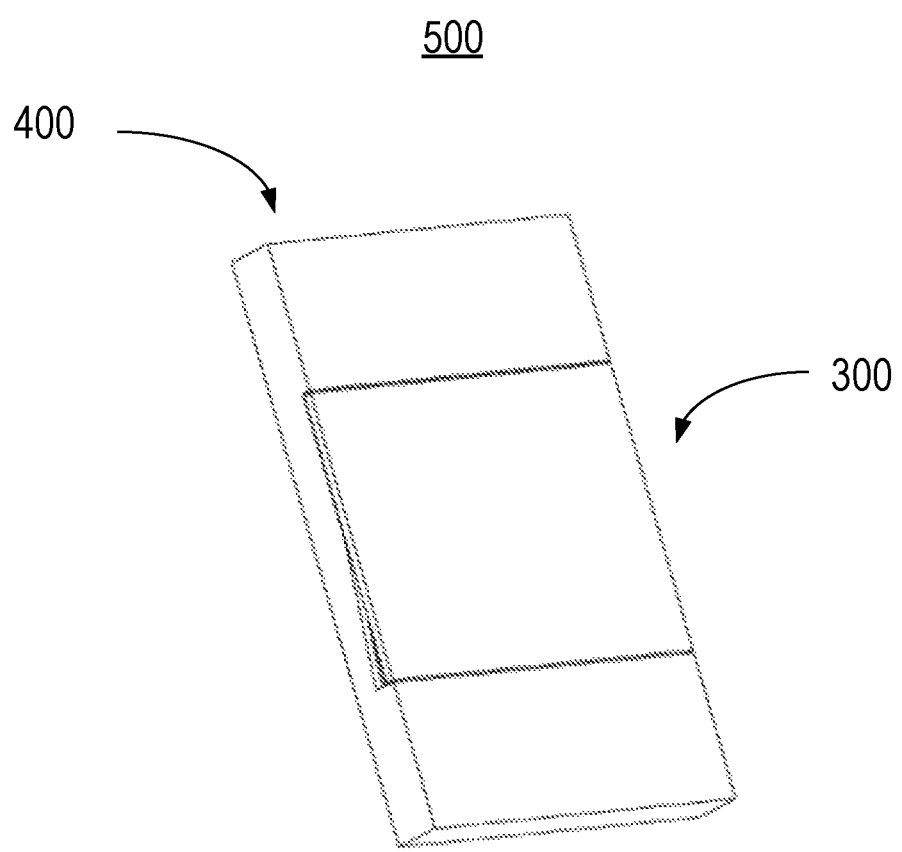
FIG. 2A illustrates a perspective view of a switch panel assembly in one status in accordance with embodiments of the present disclosure.
Figure 2B:
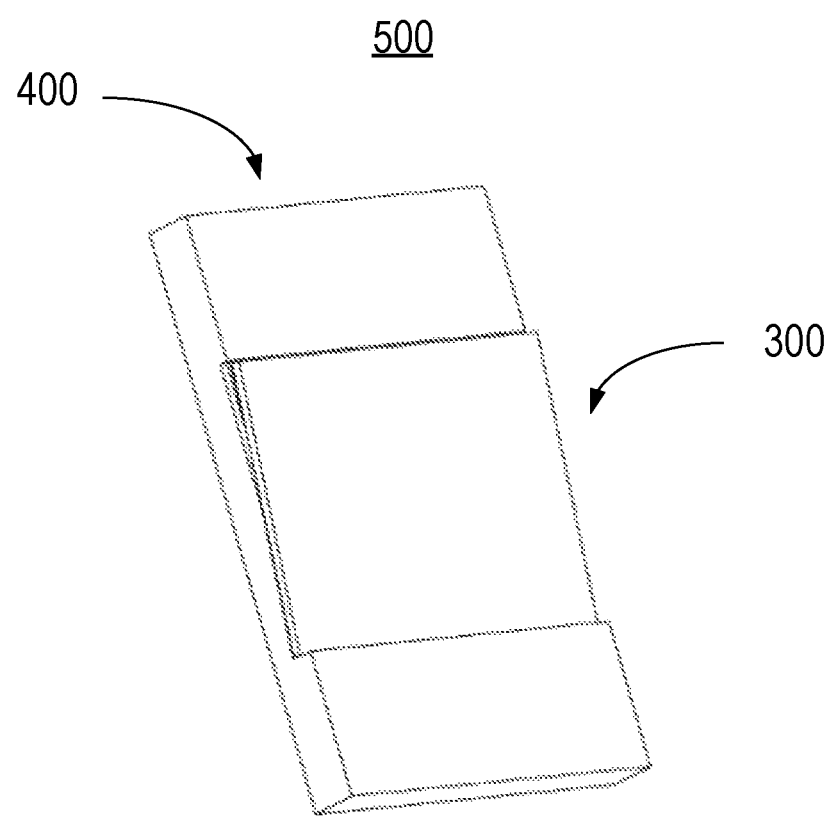
FIG. 2B illustrates a perspective view of a switch panel assembly in the other status in accordance with embodiments of the present disclosure.

FIGS. 2A and 2B illustrate perspective views of a switch panel assembly 500 in different status in accordance with embodiments of the present disclosure. A switch panel assembly 500 comprises a cover 400 and a first button 300. The cover 400 includes a body 401 and a first opening 403 formed on the body 401. The first button 300 is received in the first opening 403 and switchable between a first position and a second position. The first button 300 is coplanar with the cover 400 while in the first position and is non-coplanar with the cover 400 while in the second position.

The switch panel assembly 500 in accordance with embodiments of the present disclosure can be used together with a switch module 100 to turn on or turn off the switch module 100. One example implementation is that the switch module 100 is turned off as the first button 300 is in the first position, while the switch module 100 is turned on as the first button 300 is in the second position. For the sake of a simplified description, "first position" is referred to depict a turned off status of the switch module 100, and "second position" is referred to depict a turned on status of the switch module 100 throughout the disclosure. It is to be understood that the references as described above are merely for illustration, without suggesting any limitations as to the scope of the present disclosure. It is possible that the switch module 100 is in an opposite status to the above example implementation.

The button 11 of conventional switch assembly is always tilted relative to the cover 2, no matter the switch module 1 is turned on or turned off. By contrast, the first button 300 of the switch panel assembly 500 according to embodiments of the present disclosure is coplanar with the cover 400 in one of the on or off status, which leads to a better appearance of the switch panel assembly 500.

Figure 3A:
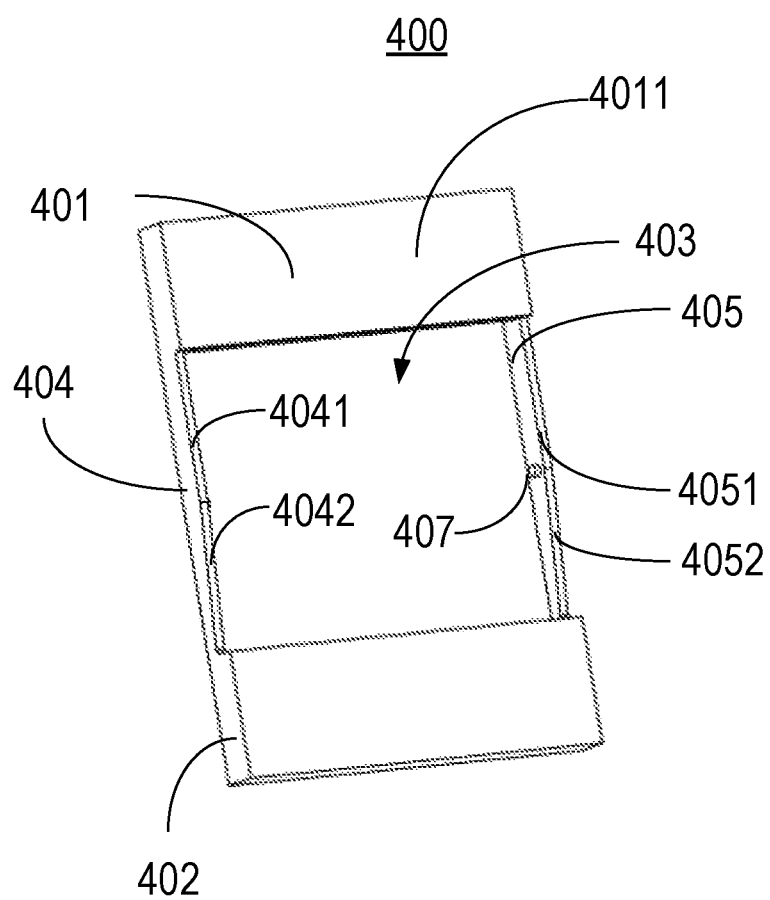
FIG. 3A illustrates a front perspective view of a cover in accordance with embodiments of the present disclosure.
Figure 3B:
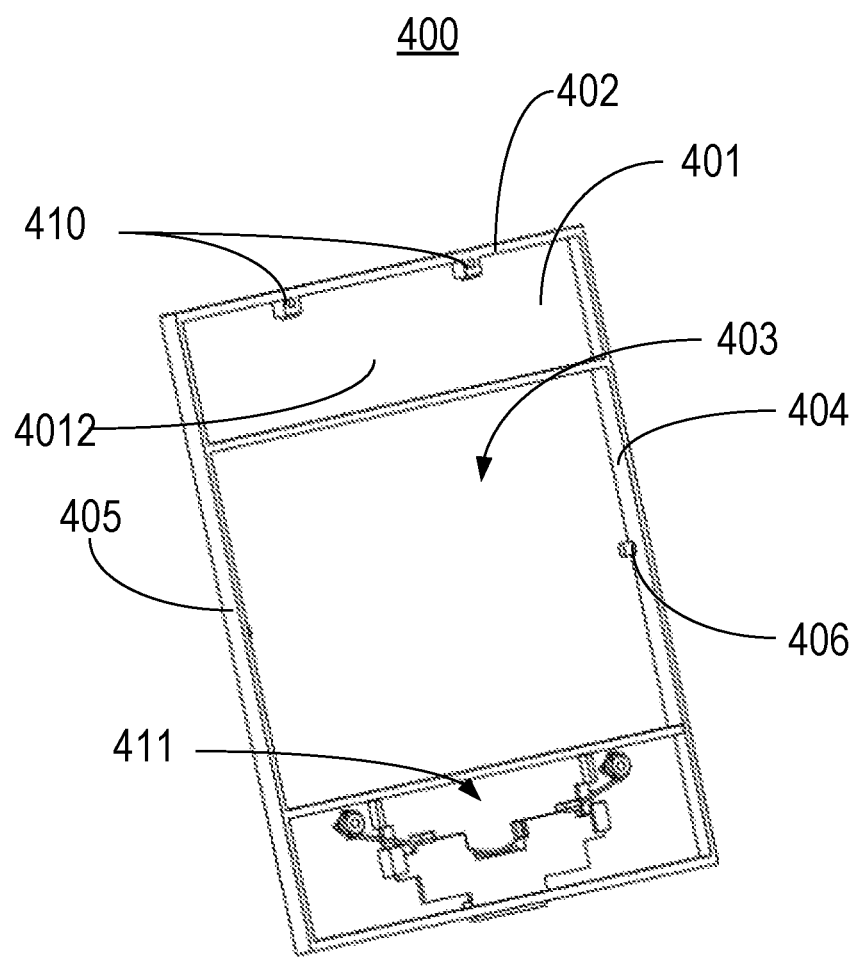
FIG. 3B illustrates a back perspective view of a cover in accordance with embodiments of the present disclosure.

As shown in FIGS. 3A and 3B, in some embodiments, the cover 400 comprises an outer surface 4011 and an inner surface 4012. As used herein, the phrase "outer" refers to the side from which a user can see and touch the switch panel assembly 500, whereas the phrase "inner" refers to the side by which the switch panel assembly 500 is connected to a switch module 100.

In some embodiments, as shown in FIGS. 3A and 3B, the cover 400 may comprise at least one arm 404, 405 across the first opening 403, each of the at least one arm 404, 405 comprising a first section 4041, 4051 and a second section 4042, 4052, wherein the first section 4041, 4051 and second section 4042, 4052 are tilt with each other. For example, the cover 400 comprises two arms 404 and 405. However, it will be appreciated that a different number, position or manner of the arms may be arranged in the cover 400. The arm 404 comprises a first section 4041 and a second section 4042. The arm 405 comprises a first section 4051 and a second section 4052. The first section 4041 and the second section 4042 are tilt with each other. The first section 4051 and the second section 4052 are tilt with each other. The first button 300 is adapted to be in contact with the first sections 4041, 4051 while in the first position, and is adapted to be in contact with the second sections 4042, 4052 while in the second position.

Accordingly, in these embodiments, the first button 300 of the switch panel assembly 500 can be supported by the arms 404, 405 of the cover 400. Hence, the movement of the first button 300 in the first opening 403 can be more smooth.

It is to be understood that the arrangement shown in FIGS. 3A and 3B is merely for illustration, without suggesting any limitation as to the scope of the present disclosure. For example, although two of arms 404, 405 are shown, it is possible to have less or more than two arms.

In some embodiments, in order to connect the first button 300 to the cover 400, there is provided at least one connecting element between the first button 300 and the cover 400. It is to be understood that the connecting element can be implemented in a variety of manners in example embodiments. For example, in some embodiments, as can be seen from FIGS. 3A to 4B, an optional implementation is that the first button 300 further comprises a first connecting plate 305 having a first hole 306 thereon and adapted to engage a first shaft 406 on the cover 400 and the first button 300 further comprises a second connecting plate 307 having a second hole 308 thereon and adapted to engage a second shaft 407 on the cover 400.

With the connection of first and second connecting plates 305, 307 and shafts 406, 407, the first button 300 can pivot on the cover 400 between the first position and the second position, so that there is provided a reliable connection between the first button 300 and the cover 400.

Alternatively, the first button 300 may be provided with a connecting shaft while the cover 400 is provided with a connecting hole accordingly. It is to be understood that a different connecting means may be used to connect the first button 300 to the cover 400.

In some embodiments, the first button 300 comprises at least one protrusion 303, 304 extending inwardly. In this way, the first button 300 can be in contact with the button 101 of the switch module 100 by the protrusion 303, 304, so that the user can control the switch module 100 by pressing the first button 300.

The at least one protrusion can be implemented in a variety of ways, thereby providing a more flexible implementation of the contacting manner between the first button 300 and the button 101 of the switch module 100.

Figure 4A:
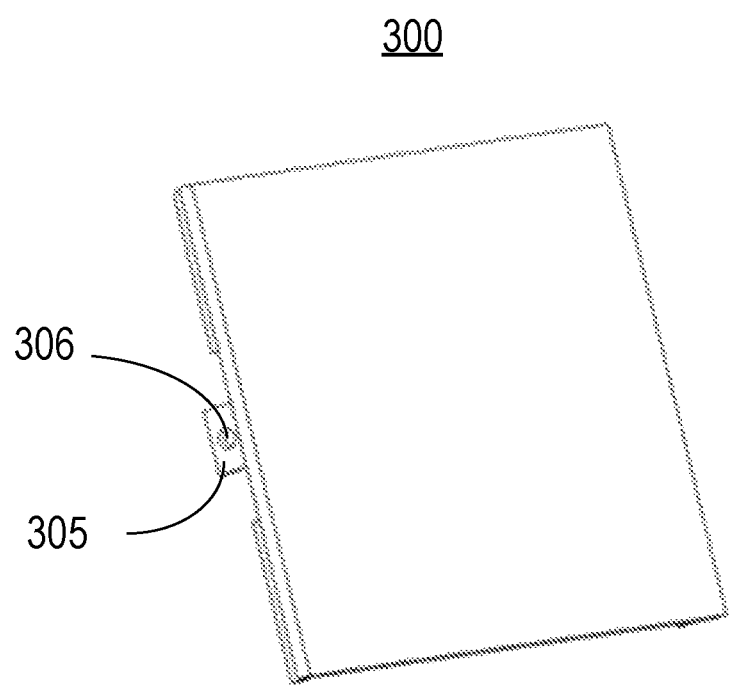
FIG. 4A illustrates a front perspective view of a first button in accordance with embodiments of the present disclosure.
Figure 4B:
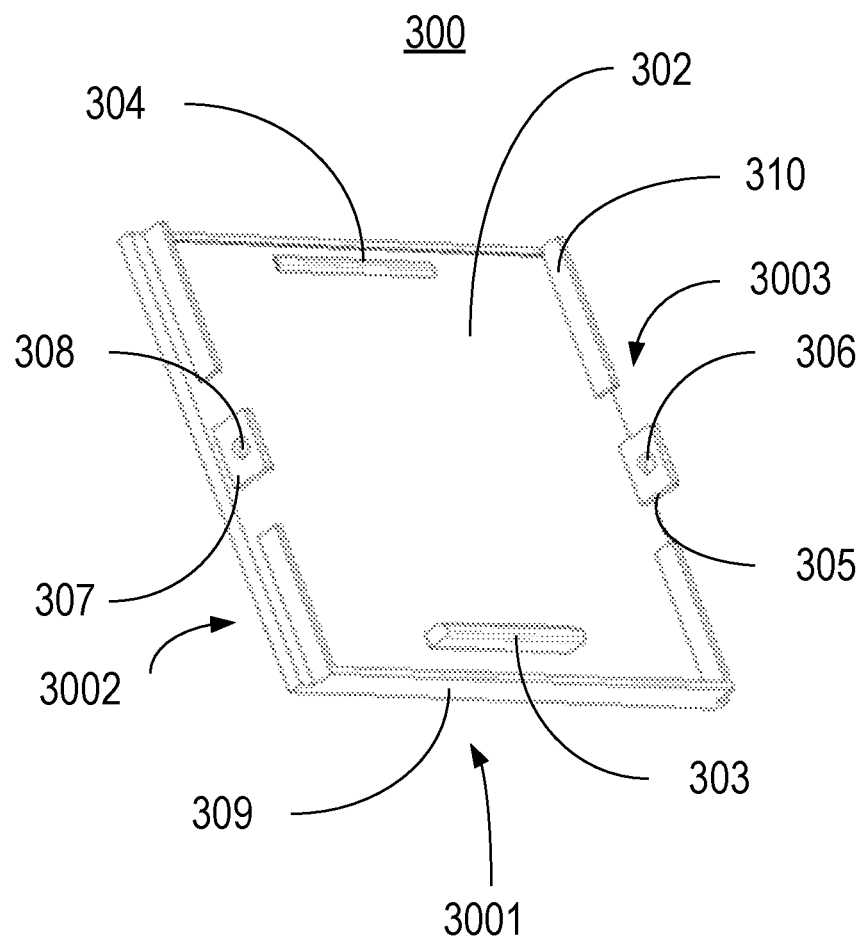
FIG. 4B illustrates a back perspective view of a first button in accordance with embodiments of the present disclosure.

In some embodiments, as can be seen from FIGS. 4A and 4B, the at least one protrusion 303, 304 comprises a first protrusion 303 and a second protrusion 304, and the first protrusion 303 is higher than the second protrusion 304. The first and second protrusions 303, 304 are located adjacent to two ends of the first button 300 respectively.

Figure 5A:
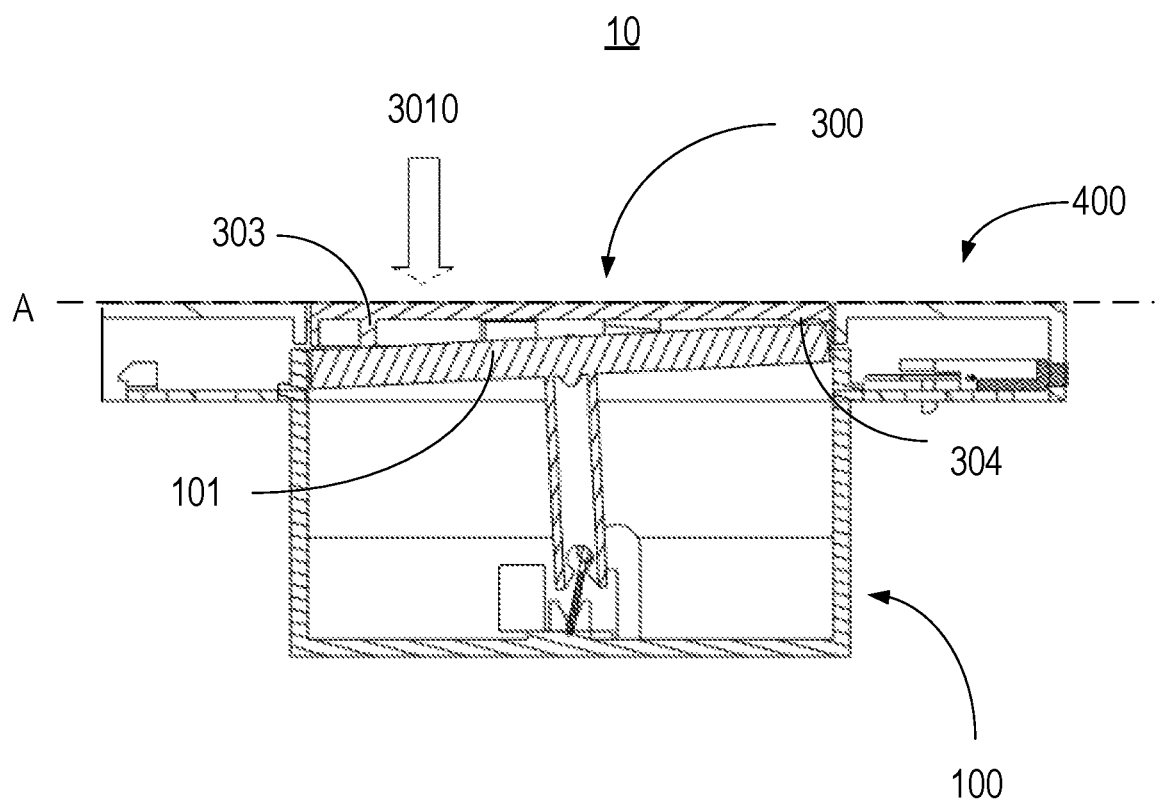
FIG. 5A illustrates a cross-sectional view of a switch assembly in one status in accordance with embodiments of the present disclosure.

As shown in FIG. 5A, through the first protrusion 303 and the second protrusion 304, the first button 300 can be tilt with respect to the button 101 of the switch module 100 while being kept in contact with the button 101. Since the button 101 of the switch module 100 is tilt with respect to the cover 400, the first button 300 can be coplanar with the cover 400 by a suitable difference of the height between the two protrusions 303, 304.

It is to be understood that the protrusions 303, 304 as described above are merely for illustration, without suggesting any limitations as to the scope of the present disclosure. It is possible to include less or more than two protrusions. For example, in the example implementation that there is only one protrusion 303, the first button 300 can be in contact with the button 101 of the switch module 100 by the protrusion 303 at one end, and by the inner surface 302 of the first button 300 directly at the other end.

In some embodiments, the first button 300 further comprises a first flange 309 extending inwardly and arranged on the edge 3001 of the first button 300 adjacent to the first protrusion 303.

By providing the first flange 309 on the edge 3001 of the first button 300 adjacent to the first protrusion 303, the gap between the first button 300 and the cover 400 is effectively shielded, so that dust in the outer surroundings can be prevented from entering the inner side of the cover 400.

In some embodiments, the first button 300 further comprises at least one second flange 310 extending inwardly, so that the first button 300 can be guide with the second flange 310 during the switch between the first position and the second position, such that the movement can be stable and smooth. The second flange 310 can be arranged in a variety of positions on the first button 300. For example, as shown in FIG. 4B, the second flange 310 are arranged on two edges 3002 and 3003 of the first button 300. However, this arrangement is only for illustration, without suggesting any limitations as to the scope of the present disclosure. Other arrangements can be used as well to guide the first button 300 for the movement in the first opening 403.

Figure 5B:
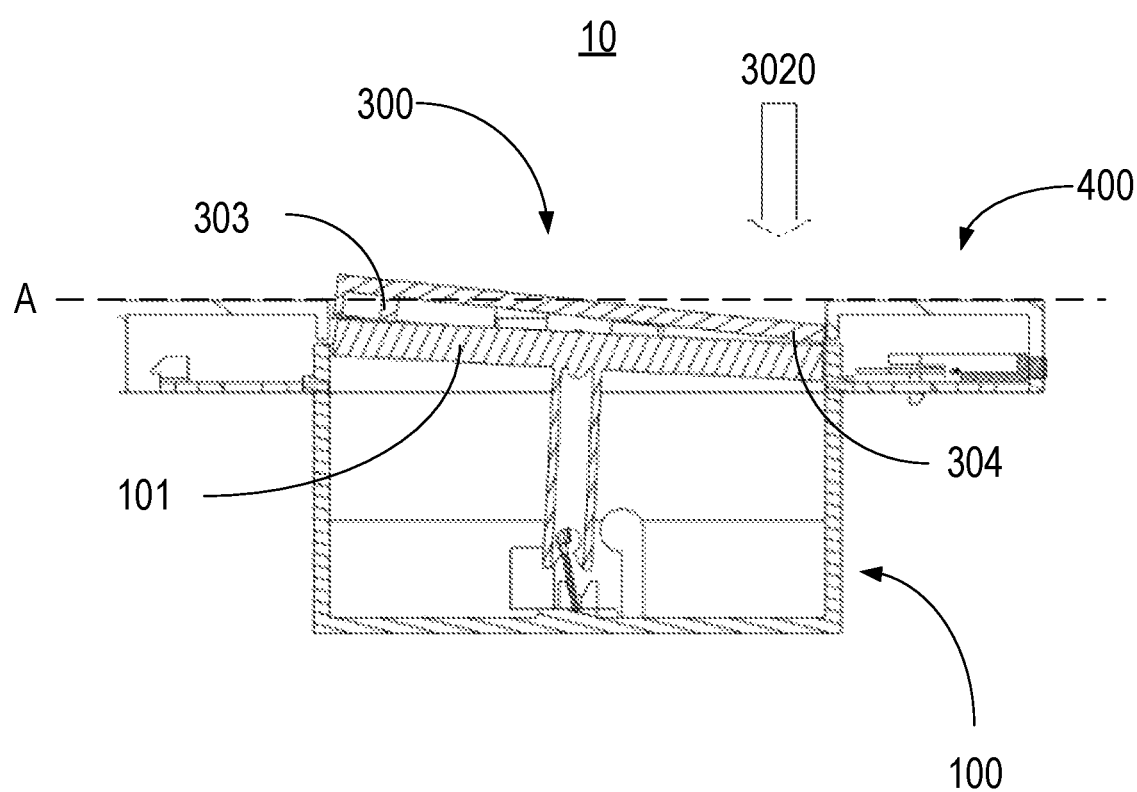
FIG. 5B illustrates a cross-sectional view of a switch assembly in the other status in accordance with embodiments of the present disclosure.

FIGS. 5A and 5B show an example arrangement of the first button 300 and the button 101 of the switch module 100. As illustrated in FIG. 5A, if a user press the first button 300 in a direction 3010, the first button 300 is coplanar with the cover 400 on a plane A. As illustrated in FIG. 5B, if a user press the first button 300 in a direction 3020, the first button 300 is non-coplanar with the cover 400, that is, is tilt with respect to the plane A. In this position, the switch module 100 is in an opposite status to the switch module 100 in FIG. 5A.

In this way, the first button 300 can be coplanar with the cover 400 while being in contact with the button 101 of the switch module 100. Therefore, a more elegant appearance of the switch assembly 10 is achieved.

Through the above discussions, it will be appreciated that the switch module 100 can be in contact with the switch panel assembly 500 in various suitable ways. The embodiments discussed above are described only to facilitate those skilled in the art in better understanding and thereby achieving the present disclosure, rather than to limit the scope of the disclosure in any manner.

As discussed above, it is necessary to connect the switch panel assembly 500 to the switch module 100. To this end, for a connection between the two parts, the switch panel assembly 500 comprises a connecting component to couple the switch panel assembly 500 to the switch module 100 according to various embodiments of the present disclosure. The connecting component can be implemented in a variety of manners in example embodiments.

For example, in some embodiments, the connecting component of the switch panel assembly 500 comprises a first set of connecting elements 410, as shown in FIG. 3B. The connecting elements 410 can be arranged on one or more inner sides of the flange 402. In the example of FIG. 3B, the connecting elements 410 are arranged on the inner side at the top of the cover 400.

It is to be understood that the arrangement shown in FIG. 3B is merely for illustration, without suggesting any limitation as to the scope of the present disclosure. For example, although only one set of connecting elements are shown, it is possible to have more connecting elements 410. Further, the first set of connecting elements 410 may also be disposed on the other inner side of the flange 402.

Figure 6:
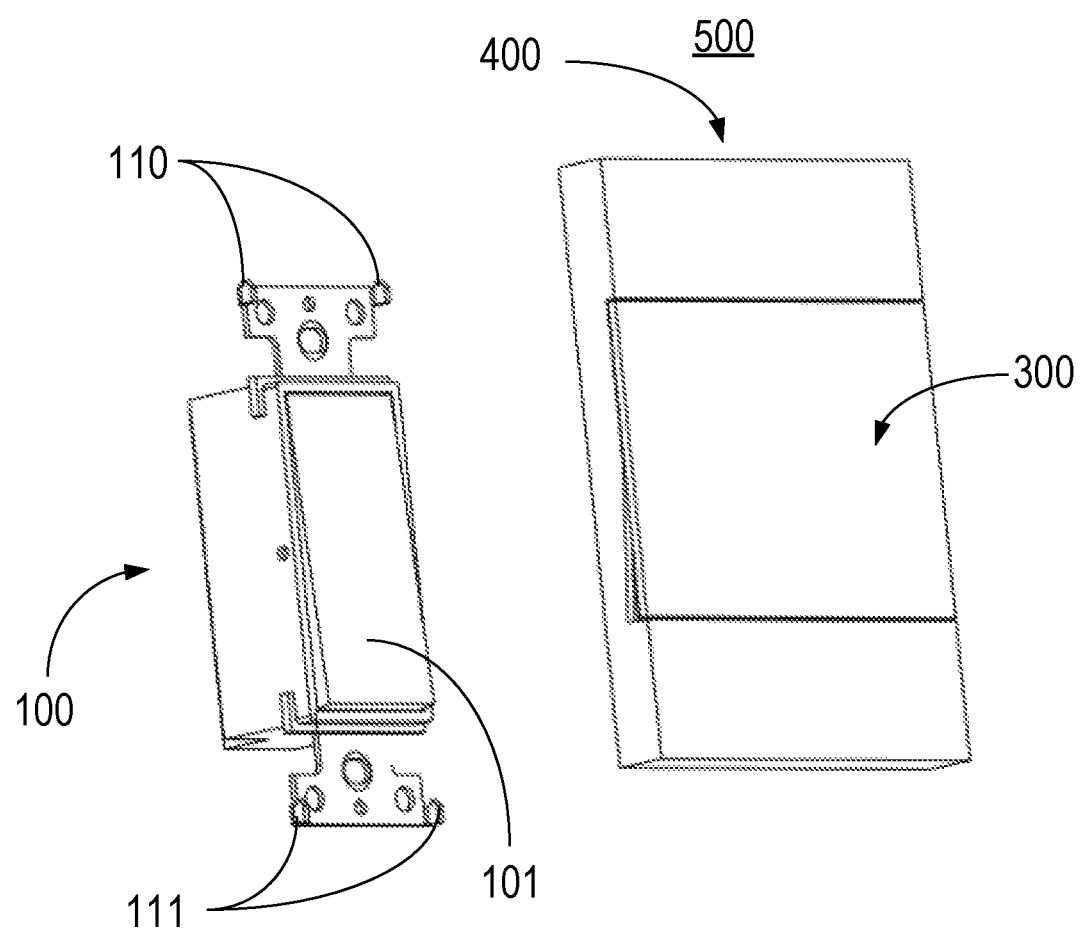
FIG. 6 illustrates an explosive perspective view of a switch assembly in accordance with embodiments of the present disclosure.

Accordingly, in those embodiments, as shown in FIG. 6, the switch module 100 comprises a second set of connecting elements 110 which are adapted to be engaged with the first set of connecting elements 410, thereby connecting the switch panel assembly 500 to the switch module 100. Examples of the first and second sets of connecting elements 410, 110 include, but are not limited to a snap-fit element or a magnetic connecting element. By using the connecting elements 410, 110, the switch panel assembly 500 can be coupled to the switch module 100 in a simple and effective fashion.

Figure 7:
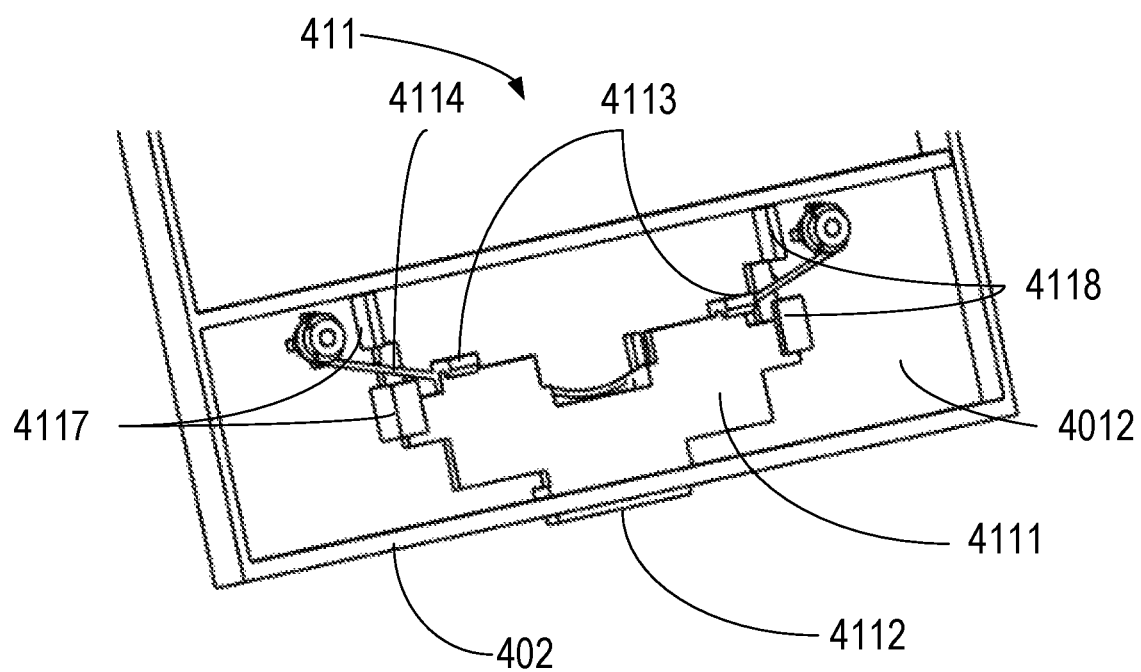
FIG. 7 illustrates a detailed view of the back of the cover in accordance with embodiments of the present disclosure.

Alternatively, or in addition, in some embodiments, the connecting component may comprise sliding lock mechanism 411. In the example shown in FIG. 3B and more detailed shown in FIG. 7, the sliding lock mechanism 411 is arranged at the bottom of the cover 400, adjacent to the lower part of the flange 402 and opposite to the first set of connecting elements 410. Other positions are possible as well.

The sliding lock mechanism 411 comprises a body 4111. There are one or more elastic elements 4114 arranged on the inner surface 4012 of the cover 400. Example of the elastic elements 4114 include, but are not limited to, an elastic wire, a spring, an elastic wall, or the like.

The elastic elements 4114 are coupled to the body 4111 to hold the body 4111 in a lock position. When the body 4111 is in the lock position, a third set of connecting elements 111 of the switch module 100 is locked with the body 4111, thereby fixing the switch panel assembly 500 on the switch module 100.

The sliding lock mechanism 411 further comprises a tongue portion 4112. The tongue portion 4112 is adapted to insert into an opening formed on the flange 402 when the body 4111 is in the lock position. It is to be understood that when the tongue portion 4112 is inserted into the opening on the flange 402 in the lock position, the end of the tongue portion 4112 may be substantially flush with or slightly protruded from the flange 402.

A user may apply a force from outside of the switch panel assembly 500 to the tongue portion 4112 via the opening, for example, by his/her finger or a tool with tip. As such, the user may push the body 4111 to move from the lock position to a release position. When the body 4111 is in the release position, the third set of connecting elements 111 can be released from the body 4111.

In this way, the user can easily separate the switch module 100 and the switch panel assembly 500 by using the finger to press the tongue portion 4112 without using an additional auxiliary tool.

In some embodiments, the switch panel assembly 500 further comprises a set of guiding elements 4117, 4118 arranged on the inner surface 4012 of the cover 400. The body 4111 can be held in and move along the guiding elements 4117, 4118 between the lock and release positions. The guiding element 4117, 4118 can facilitate movement of the body 4111 to be more smooth.

In some embodiments, the sliding lock mechanism 411 further comprises a fourth set of connecting elements 4113 which are formed on the body 4111 and adapted to engage the third set of connecting elements 111 of the switch module 100 when the body 4111 is in the lock position.

In the embodiments as described above with reference to FIGS. 3B, 6, and 7, the switch panel assembly 500 is directed connected to the switch module 100 in aid of the connecting component. Alternatively, in other embodiments, the switch panel assembly 500 and the switch module 100 can be connected to each other via one or more intermediate components.

Figure 8:
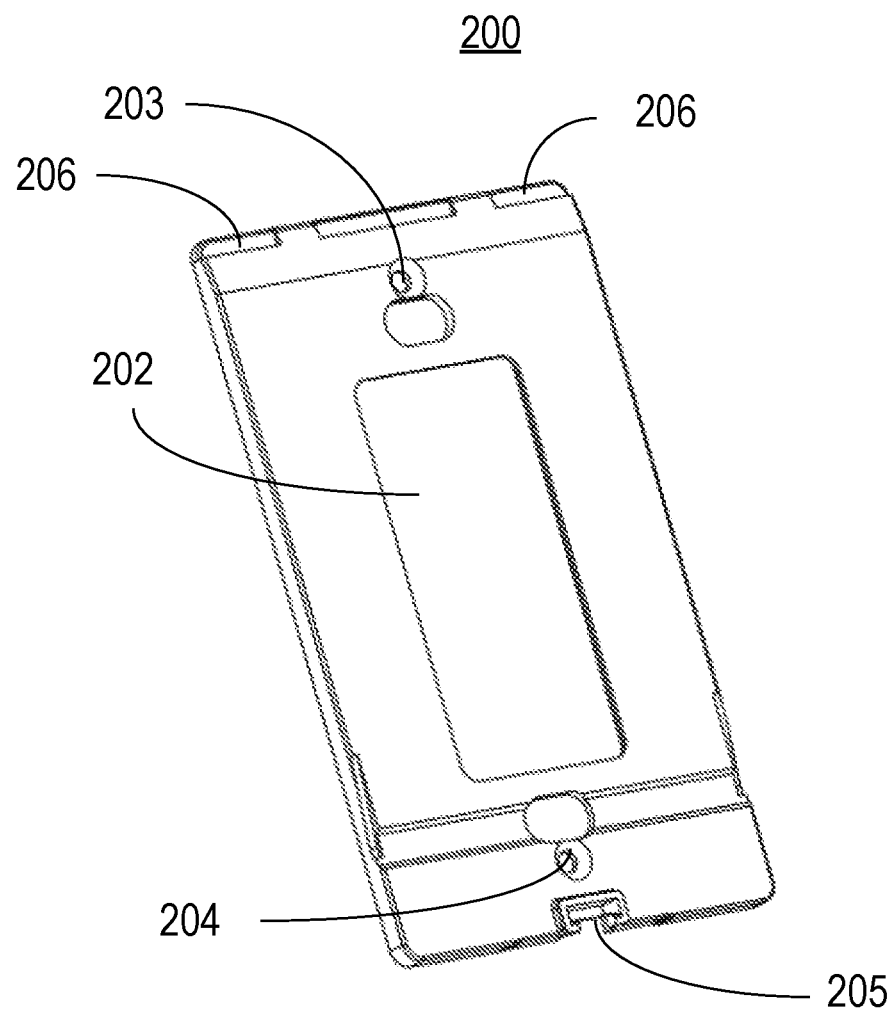
FIG. 8 illustrates a perspective view of an intermediate cover in accordance with embodiments of the present disclosure.

FIG. 8 illustrates a perspective view of an intermediate cover 200 in accordance with embodiments of the present disclosure. The intermediate cover 200 can be mounted and fixed to the switch module 100. To this end, in some embodiments, the intermediate cover 200 may comprise a first set of screw holes 203, 204 and the switch module 100 comprises a corresponding second set of screw holes. The screw holes can be connected by screws, thereby implementing connection of the intermediate cover 200 and the switch module 100.

Figure 9:
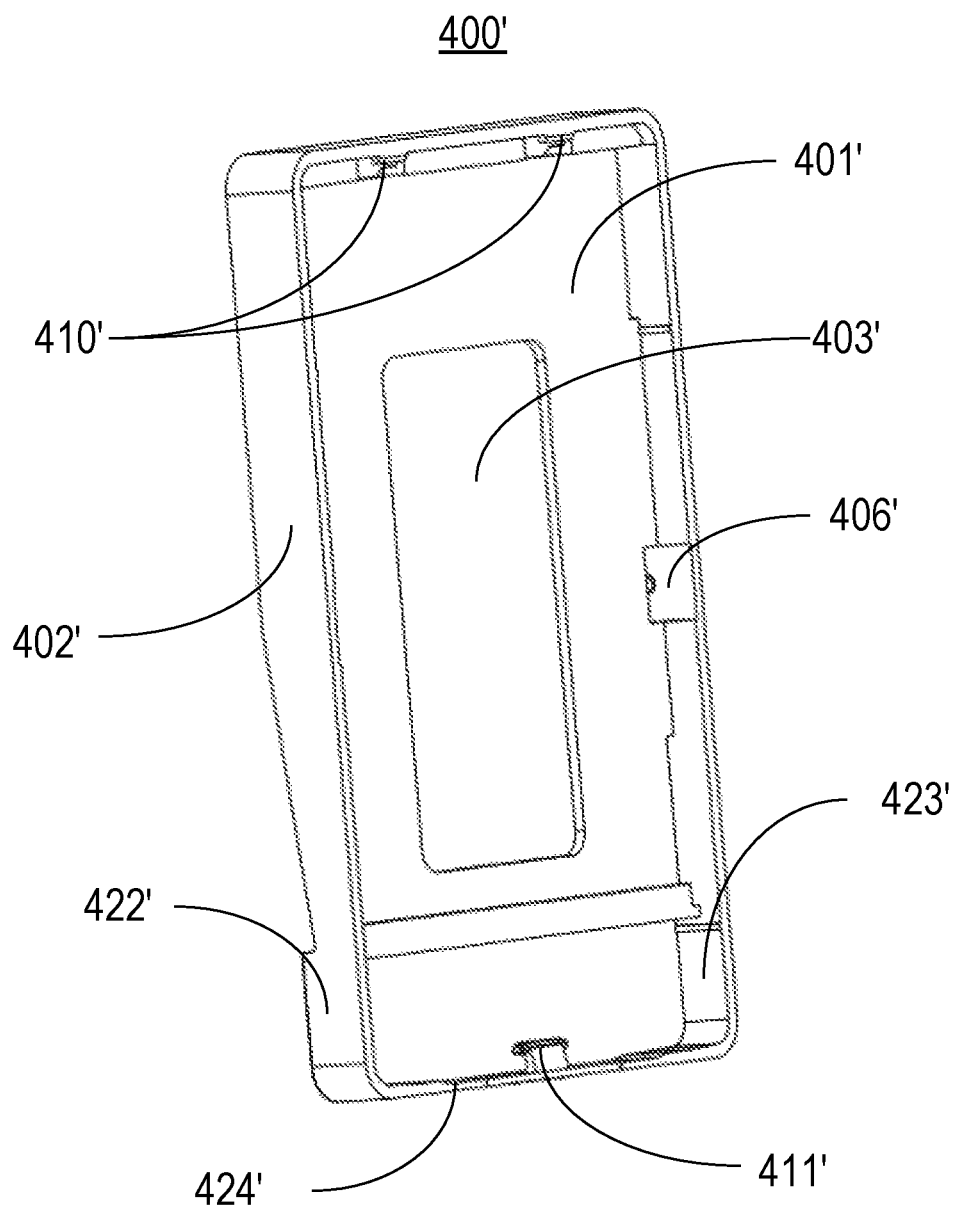
FIG. 9 illustrates a perspective view of a cover in accordance with another embodiment of the present disclosure.

In some embodiments, as shown in FIGS. 8 and 9. The cover 400' is adapted to be connected to the intermediate cover 200. For example, in some embodiments, the connecting component of the cover 400' may comprise a fifth set of connecting elements 410', for example, arranged on at least one inner side of a flange 402'. Accordingly, the intermediate cover 200 may include at least one recess 206 adapted to be engaged with the connecting elements 410'.

In this way, an intermediate cover 200 of conventional style may be used so as to facilitate the implementation of the switch panel assembly 500 in accordance with embodiments of the present disclosure.

In order to allow the user to operate the button 101 of the switch module 100, the intermediate cover 200 may comprise a second opening 202 for exposing the button 101 of the switch module 100.

In some embodiments, as shown in FIG. 9, the at least one connecting component comprises at least one supporting arm 422', 423' extending away from the body 401' of the cover 400' and at least one connecting arm 424' supported by the at least one supporting arm 422', 423'. The at least one connecting component comprises a sixth set of connecting elements 411' arranged on the at least one connecting arm 424' and adapted to engage a seventh set of connecting elements 205 of the intermediate cover 200 to connect the cover 400' to the intermediate cover 200.

It is to be understood that the arrangement shown in FIG. 9 is merely for illustration, without suggesting any limitation as to the scope of the present disclosure. For example, although two supporting arm 422', 423' are shown, it is possible to have less or more than two supporting arms. Further, the sixth set of connecting elements 411' may be arranged on any position on the at least one connecting arm 424'.

In FIG. 9, the cover 400' comprises a third opening 403' for receiving the first button 300. The first button 300 may be connected to the cover 400' by the connecting element 406' on the cover 400' and the connecting elements on the first button 300.

In this way, the user can easily separate the cover 400' of the switch panel assembly 500 from the intermediate cover 200 by simply pressing the connecting arm 424' and causing the sixth set of connecting elements 411' disconnected with the intermediate cover 200.

It is to be understood that the connection mechanisms as described above are merely for illustration, without suggesting any limitations as to the scope of the present disclosure. Other mechanisms can be used as well to connect the intermediate cover 200 with the switch panel assembly 500 and/or the switch module 100.

Through the above discussions, it will be appreciated that the switch panel assembly 500 in accordance with embodiments of the present disclosure can be replaced or changed in a very effective and efficient manner, for example, even without any auxiliary tool. Moreover, the switch panel assembly 500 can easily meet the individual requirements of end users, without being limited by the switch module.

As shown in FIG. 6, the switch assembly 10 comprises a switch panel assembly 500 according to any of preceding claims, and a switch module 100 having a second button 101, wherein the switch module 100 is covered by the switch panel assembly 500.

Moreover, a method for manufacturing the switch panel assembly 500 as described above and a method for manufacturing the switch assembly 10 as described above are provided.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A switch panel assembly comprising:
   a cover including a body and a first opening formed on the body; and
   a first button received in the first opening and switchable between a first position and a second position;
   the first button being coplanar with the cover while in the first position and being non-coplanar with the cover while in the second position, wherein the cover further comprises at least one connecting component adapted to connect the cover to a switch module, and wherein the at least one connecting component comprises a first set of connecting elements arranged on at least one inner side of a flange around the body of the cover and adapted to connect the cover to an intermediate cover fixed on the switch module.

2. The switch panel assembly according to claim 1, wherein the at least one connecting component further comprises:
   at least one supporting arm extending away from the body of the cover;
   at least one connecting arm supported by the at least one supporting arm; and
   a second set of connecting elements arranged on the at least one connecting arm to connect the cover to the intermediate cover.

3. The switch panel assembly according to claim 1, wherein the first button comprises at least one protrusion extending inwardly.

4. The switch panel assembly according to claim 3, wherein the at least one protrusion comprises a first protrusion and a second protrusion, the first protrusion being higher than the second protrusion.

5. The switch panel assembly according to claim 4, wherein the first and second protrusions are located adjacent to two ends of the first opening respectively.

6. The switch panel assembly according to claim 4, wherein the first button further comprises a first flange extending inwardly and arranged on an edge of the first button adjacent to the first protrusion.

7. The switch panel assembly according to claim 6, wherein the first button further comprises at least one second flange extending inwardly and arranged on at least one of the edges of the first button traversely to the first flange.

8. The switch panel assembly according to claim 3, wherein the first button further comprises a first connecting plate having a first hole thereon and adapted to engage a first shaft on the cover.

9. The switch panel assembly according to claim 8, wherein the first button further comprises a second connecting plate having a second hole thereon and adapted to engage a second shaft on the cover.

10. A switch assembly comprising:
    a switch module having a second button; and
    a switch panel assembly according to claim 1 adapted to detachably connect to the switch module via a connecting component.

11. A method for manufacturing the switch assembly according to claim 10.

12. A method for manufacturing the switch panel assembly according to claim 1.

* * * * *